United States Patent Office 3,297,624
Patented Jan. 10, 1967

3,297,624
ELASTOMERIC COMPOSITIONS OF OIL AND URETHANE-LINKED RESINS
Bruce W. Hotten, Orinda, Calif., assignor to Chevron Research Company, a corporation of Delaware
No Drawing. Filed May 10, 1965, Ser. No. 454,641
6 Claims. (Cl. 260—33.6)

This application is a continuation of my copending patent application Serial No. 188,268, entitled "Strippable Coatings," filed April 17, 1962.

The present application is directed to materials especially useful as protective coatings for metal and wooden objects, etc., and as bases for flexible foam materials which are in turn suitable as insulation, padding, etc.

Many articles of commerce which are not perishable are stored for long periods of time after their manufacture until they are used. For example, many automotive parts such as gears, etc., are manufactured and shipped to assembly plants where they are stored prior to assembly of the machinery and to warehouses where parts are kept prior to their use for repair of machinery such as motor vehicles, etc. Also, wood materials such as plywood sheeting and varous decorative panelling are often stored prior to use. It is thus often necessary to apply protective coating material to such objects to protect them from damage from corrosion and from physical damage which often occurs during shipment.

The first significant application of strippable coatings was the use of such coatings to protect cargoes carried on ship decks during World War II when all available space was employed for transportation of cargo. Subsequently, many ships which were stored or "mothballed" after the war were protected by coating the numerous parts of the ship, such as the decks, guns, rails, engines, etc., to protect the metallic parts from corrosion.

Cosmoline has been extensively employed as a protective coating composition. This material is often applied to the metallic parts which are being stored, as for example, the ship parts previously enumerated. However, a disadvantage of the cosmoline has been the effort and time necessary to remove material when the storage period ends. Thus, it is necessary first to wipe off the coated parts to remove the excess cosmoline and follow it by numerous solvent washes to make sure that all of the sticky coating has been removed. Also, the protection of wood materials by cosmoline is not entirely satisfactory, as the greaselike substance often discolors them. In addition, various vinyl polymers have been used for strippable coatings. However, these materials are practically limited to uses as coatings on metal surfaces. They are not suitable for use in coating painted parts because the plasticizers and solvents employed in the coating affect painted surfaces. Further, the vinyl coating materials are expensive, making them entirely uneconomical for coating a low-cost item.

Other coatings have been prepared from the so-called "cellulosics," for example, ethyl cellulose and cellulose acetate butyrate. The cellulosics can be melted and the metal parts to be coated dipped into the melt. Although the cellulosics do form protective coatings for metal, the coating is removed only with difficulty. Also, they are not suitable for use in coating wood articles.

In addition to the materials which are applied as a solid coating to protect the surfaces of objects, it is often desirable to provide materials that exist in the form of foam, that is, materials which contain from within them a multitude of very fine gas-filled cavities or bubbles. Thus, examples of such materials which have been employed are the polyurethanes and foam rubber, etc. They are especially useful for providing backings for rugs, for various insulating purposes, for providing protective surfaces of a higher thickness and thus greater protection from physical harm than the previously discussed thin coating materials. While foam rubber is an excellent material for these purposes, it is quite expensive, and thus its use in many applications is precluded by its expense.

In copending U.S. patent application No. 188,268, of which this application is a continuation-in-part, there are disclosed coating compositions which comprise oils containing polymers of olefins and olefinic alcohol esters. In copending application Serial No. 449,878, filed April 21, 1965, there are disclosed coating materials comprising oils, and polymers having attached to the backbone, in addition to ester groups, free hydroxyl groups. These materials have significantly higher tensile strenth than those of the previously noted application, and in addition are especially suitable for the production of high strength, highly elastic foams.

It has now been found that low-cost and highly elastic coatings and foams of even greater strength may be produced by cross-linking the materials which contain free hydroxyl groups with certain polyisocyanates. Thus, the compositions of this invention comprise a petroleum base oil having an aromatic ring content of from about 15 to 75% by weight and from 20 to 80% by weight of a cross-linked polymer formed by reacting (X) a polyisocyanate of the formula:

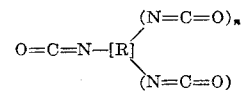

wherein R is a divalent hydrocarbon radical, preferably a hydrocarbylene radical of 1 to 40 carbon atoms, and $n$ is a number 0 to 1, with (Y) a polymer of randomly distributed monomer units characterized by the formulae:

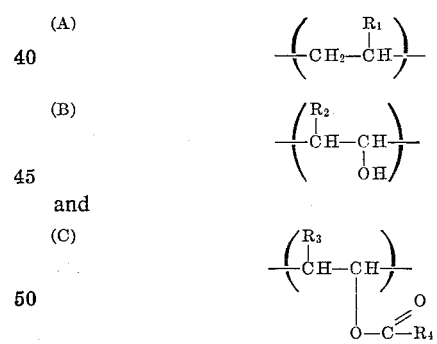

wherein $R_1$, $R_2$ and $R_3$ are selected from the group consisting of hydrogen and alkyl radicals of 1 to 2 carbon atoms, $R_4$ is selected from the group consisting of hydrogen and alkyl radicals of 1 to 11 carbon atoms, (A) is present in the polymer in the amount of 80 to 95 mol percent, (B) in the amount of 0.1 to 5 mol percent and (C) in the amount of 5 to 20 mol percent.

Thus, the polymers which are cross-linked to form the composition of this invention are derived from an olefin, an olefinic alcohol and an ester of an olefinic alcohol with a monocarboxylic acid. Suitable olefins which make up unit (A) in the polymer include ethylene, propylene, butylene and isobutylene. Suitable olefinic alcohols from which unit (B) is derived include vinyl alcohol, allyl alcohol, 2-butenol, 1-butenol, etc. The unit represented by (C) is derived from an ester of olefinic alcohols listed above and a monocarboxylic acid of from 1 to 12 carbon atoms. Thus, suitable acids include formic, acetic, propionic, butanoic, octanoic, hexanoic, lauric, etc. Unsaturated acids may also be included, such as propenoic acid, butenoic, octenoic, etc. The polymers may be prepared by any suitable method. Ordinarily, free-radical polymerization is utilized with a free-radical producing catalyst, such as oxygen or an organic peroxide, at test pressures and temperatures from 150 to 250° C. However, a more simple method of producing the polymers comprises reacting an olefin and the ester of an unsaturated alcohol under free-radical conditions at a pressure from 100 to 200 atmospheres at a temperature in the order of 150 to 250° C., distilling to remove unreactive materials and hydrolyzing a portion of the ester groups. From 5 to 50% of the ester groups are hydrolyzed. The preferred polymers have molecular weights in the general range from about 100,000 up to about 1,000,000.

The preferred method of hydrolyzing the ester groups mentioned above is by saponification with a strong base, such as NaOH, KOH, etc. The saponification can be accomplished by mixing the base in proper proportion with the polymer, preferably in situ, that is, in the oil solution.

An example of a preferred polymer is one which is prepared by the saponification of a copolymer of ethylene and vinyl acetate. These copolymers are well known in the art and are prepared by reacting an ester of vinyl alcohol and acetic acid, with ethylene at a pressure of about 15,000 to about 30,000 p.s.i.g. at a temperature in the range of above 150° C. and separating the resulting copolymer from the unreactive monomer.

Examples of suitable isocyanates which may be employed to increase the strength and softening point of the resins include alkyl and cycloalkyl diisocyanates of from 1 to 40 carbon atoms, and aryl and alkaryl diisocyanates of from 6 to about 40 carbon atoms. Examples of suitable alkyl materials include methyl diisocyanate, ethylene diisocyanate, propylene diisocyanate, etc. A particularly useful and preferred diisocyanate cross-linking material is a "Dimeryl" diisocyanate produced by General Mills Corporation. This material is derived from 36-carbon acid produced by the control polymerization of unsaturated 18-carbon fatty acids. Linoleic acid is primarily employed. The major component of the resulting diisocyanate material is a compound of the following structure:

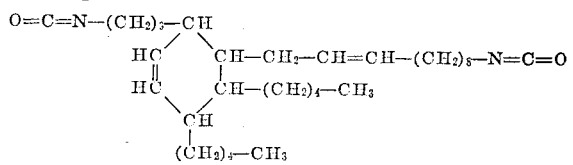

This material is derived from a corresponding diacid by aminolysis to form the amide, reduction to form the cyanate group, hydrogenation to the amine, and treatment with $COCl_2$ to form the isocyanate.

Suitable aryl diisocyanates include benzene diisocyanate, tolylene diisocyanate, bi-tolylene diisocyanate, etc.

The cross-linking reaction is effected by contacting the polymer with the diisocyanate in oil solution. Physical mixing will produce the necessary intimate contact to effect the reaction. However, in many cases it may be preferable to heat the mixture in order to more closely contact the reactants.

As noted, the compositions of this invention may be used as coating materials as prepared or may be converted into foams. Foams provide greater cushioning effects than the unfoamed material and are preferable for many uses. The foams may be prepared by introducing into the composition foaming agents, such as azobisisobutyronitrile. The introduction is made at a temperature below the "foaming" temperature, or decomposition temperature, of the agent. The composition is then heated to that temperature, whereupon bubbles evolve from the agent into the composition, expanding it. The composition is then cooled to allow the bubbles to set in the foamed material. Other chemical foaming agents which may be used include azobisformamide and sym.-dichlorotetrafluoroethylene. Other techniques of foaming may be employed; for example, mechanical methods and also those techniques in which gas under high pressure is injected into the composition. However, since the foaming techniques are not a part of the invention, they will not be described in further detail.

The oils which are used as a base for the composition comprise a variety of lubricating oils, such as naphthenic base, paraffin base and mixed-base oils and oils derived from synthetic processes. The oils should have an aromatic ring content of from about 15 to 75% by weight. Oils which are preferred for use in the compositions are polyalkylbenzenes, such as polypropenylbenzene. An example of a preferred oil is an alkylbenzene bottom oil which is benzene alkylated with polypropylene having an average side chain length of $C_{19}$, which may comprise one to about three separate side chains, and a total molecular weight of about 350.

It is also preferred that the oils have an aniline point below 150° F.

The following examples characterize the compositions of the invention. The examples are intended to be illustrative and non-limiting:

EXAMPLE I 250.0 g. of a copolymer of ethylene and vinyl acetate (copolymer containing 72% by weight ethylene units and 28% by weight vinyl acetate units) having a molecular weight of about 400,000 was mixed with a 250 g. portion of alkylbenzene. The alkylbenzene had an average side chain length of 19 and a molecular weight of about 350. The mixture was heated and stirred until the copolymer was dispersed in the oil (about 300° F.), then cooled to about 200° F. 5.0 g. of NaOH was added to the solution, and the mixture was then heated to about 300° F. and stirred for ten minutes. The mixture was then allowed to cool, yielding a flexible elastomer having a percent elongation of 570.

EXAMPLE II

*Preparation of cross-linked polymer composition*

A 50.0 g. portion of the product of Example I was heated to 200° F., at which point 0.1 g. of tolylene diisocyanate was mixed into the material. The mixture was then heated with stirring to 350° F. and allowed to cool. A flexible elastomer resulted having a tensile strength of 250 p.s.i. and percent elongation of 560.

EXAMPLE III

*Preparation of cross-linked polymer*

The procedure of Example II was repeated using 0.2 g. (0.4%) tolylene diisocyanate. The mixture was heated only to 300° F. An elastomer resulted having a tensile strength of 240 p.s.i. and percent elongation of 390.

EXAMPLE IV

The procedure of Example I was followed employing 9440 g. (59%) of an aromatic lube-oil extract, 6400 g. (40% by weight) of an ethylene-vinyl acetate copolymer having a molecular weight in excess of 400,000 and containing 73% by weight ethylene units and 27% by weight vinyl acetate units.

EXAMPLE V

*Preparation of cross-linked composition using "dimeryl" isocyanate*

99.0 g. of the material prepared in Example IV was mixed at a temperature of 150° F. with 1.0 g. of the "Dimeryl" isocyanate previously described. The mixture was then heated to 350° F. and allowed to cool, yielding a tough, dry elastomer. The material had a softening temperature of about 300° F., a tensile strength of 480 p.s.i. and percent elongation at break of 1300.

From the data shown in these examples, it can be noted that the materials cross-linked with isocyanate have significantly higher tensile strength than the non-cross-linked material. A comparative sample of 40% copolymer and oil which had not been saponified had a tensile strength of 140 and a percent elongation of 678. The increase to 480 p.s.i. tensile strength for the material saponified and cross-linked with "Dimeryl" isocyanate is highly significant. Thus, elastomers containing up to 80% of an inexpensive oil base and having very high strengths may be prepared.

As noted, foams of high strength may be produced from the cross-linked compositions of this invention. The following examples illustrate their preparation:

EXAMPLE VI

*Preparation of foam from noncross-linked polymer compositions*

To a portion of the material produced in Example I was added 5% by weight of a nitrogen-releasing foaming agent having a decomposition temperature in the range of 190–220° F. The mixture was heated to a temperature of 240° F., at which point foaming occurred. The mixture was allowed to cool, yielding a foamlike material having a density of 0.21 g. per cc. or 13 lbs. per cu. ft.

EXAMPLE VII

*Preparation of foam from cross-linked composition*

5% of a nitrogen-releasing foaming agent having a decomposition temperature in the range of 250–270° F. was added to a portion of the material produced in Example II. The mixture was stirred and heated to a temperature of about 300° F., at which point foaming occurred. The mixture was allowed to cool, yielding a tough foam having a density of 0.17 g. per cc. or 10 lbs. per cu. ft.

Thus, it can be seen that these compositions of the invention may be processed into tough, inexpensive, lightweight foams which have many uses in industry, etc.

While the compositions of this invention have been described in detail and many examples set forth of various embodiments of the invention, the examples are but illustrative, and the scope is only intended to be limited by the appended claims.

Other materials useful in the formation of coatings may also be included in the compositions of the invention. Such materials include polyethylene, polypropylene, etc., of either high density isotactic or atactic structure. Also, it is desirable to include agents such as oxidation inhibitors, corrosion inhibitors, etc.

I claim:

1. A coating composition consisting essentially of a hydrocarbon lubricating oil base having an aromatic ring content of from about 15 to 75% by weight and from 20 to 80% by weight of a cross-linked polymer formed by reacting in situ (X) a polyisocyanate of the formula:

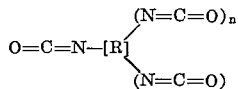

wherein R is a non-benzenoid radical of 36 to 54 carbon atoms and $n$ is a cardinal number 0 to 1, with (Y) a polymer consisting essentially of randomly distributed monomer units characterized by the formulae:

(A) 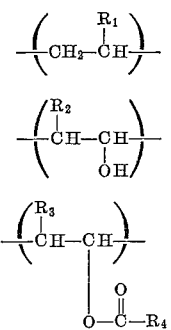

(B)

(C)

wherein $R_1$, $R_2$ and $R_3$ are selected from the group consisting of hydrogen and alkyl radicals of 1 to 2 carbon atoms, $R_4$ is selected from the group consisting of hydrogen and alkyl radicals of 1 to 11 carbon atoms, (A) is present in the polymer in the amount of 80 to 95 mol percent, (B) in the amount of 0.1 to 5 mol percent and (C) in the amount of from 5 to 20 mol percent.

2. The composition of claim 1 wherein the base oil has an aromatic ring content of from 20 to 40% by weight.

3. The composition of claim 2 wherein $R_1$, $R_2$ and $R_3$ are hydrogen and $R_4$ is methyl.

4. The composition of claim 1 wherein the polyisocyanate is a diisocyanate of the formula:

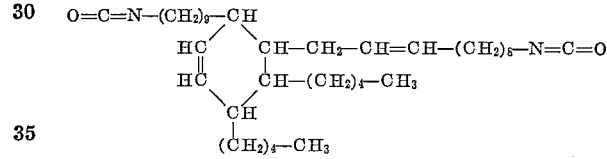

5. The composition of claim 4 in which $R_1$, $R_2$ and $R_3$ are hydrogen and $R_4$ is methyl.

6. The composition of claim 1 in which the polyisocyanate is a diisocyanate of the formula:

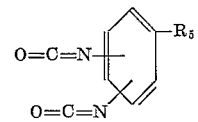

in which $R_5$ is an alkyl radical derived from propylene tetramer.

References Cited by the Examiner

UNITED STATES PATENTS

| | | |
|---|---|---|
| 2,386,347 | 10/1945 | Roland. |
| 2,394,101 | 2/1946 | Phillips et al. _____ 117—6 |
| 3,037,959 | 6/1962 | Lavin et al. |
| 3,177,167 | 4/1965 | Skreckoski et al. |

FOREIGN PATENTS

| | | |
|---|---|---|
| 831,056 | 3/1960 | Great Britain. |

OTHER REFERENCES

Dombrow: Polyurethanes; Reinhold Plastics Applications Series, 1957, pages 16, 17, 20–23, 83.

MORRIS LIEBMAN, *Primary Examiner.*

L. T. JACOBS, *Assistant Examiner.*